UNITED STATES PATENT OFFICE.

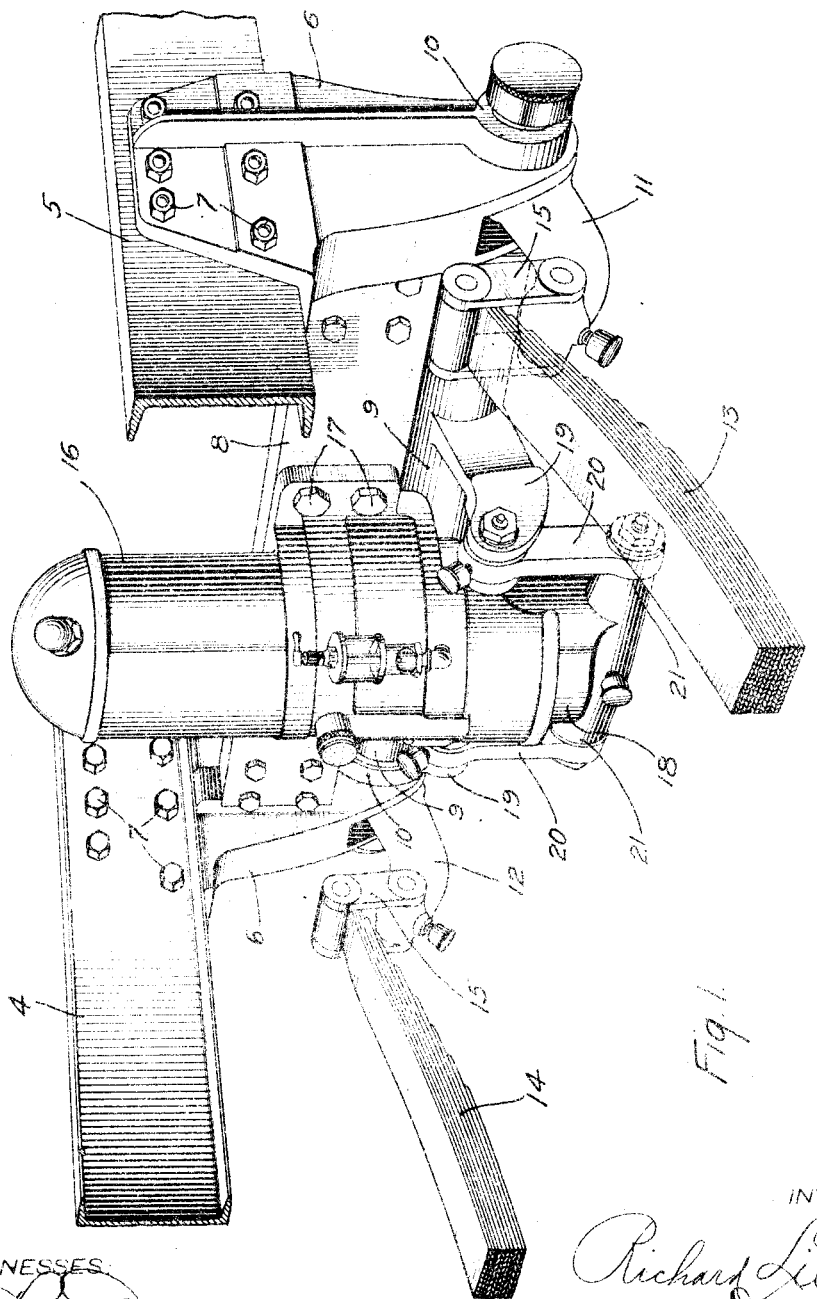

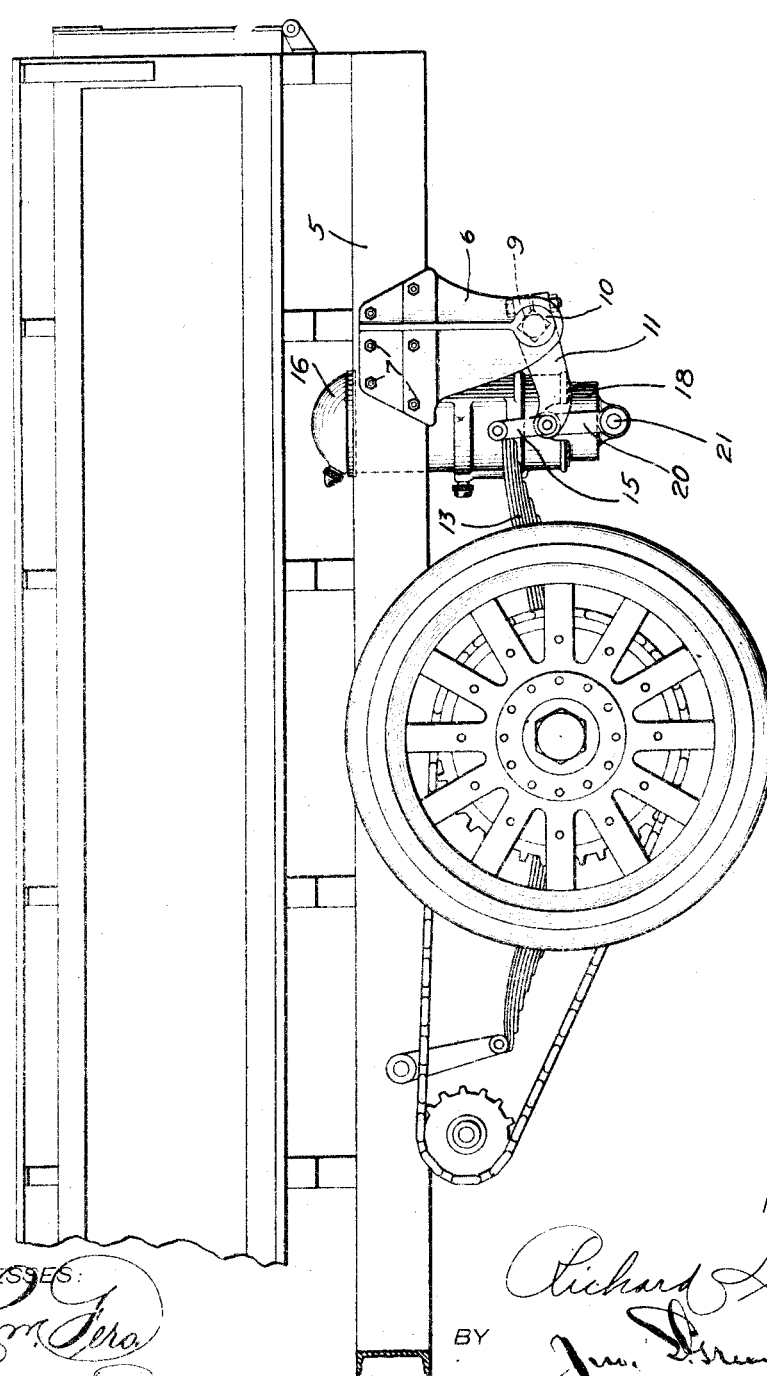

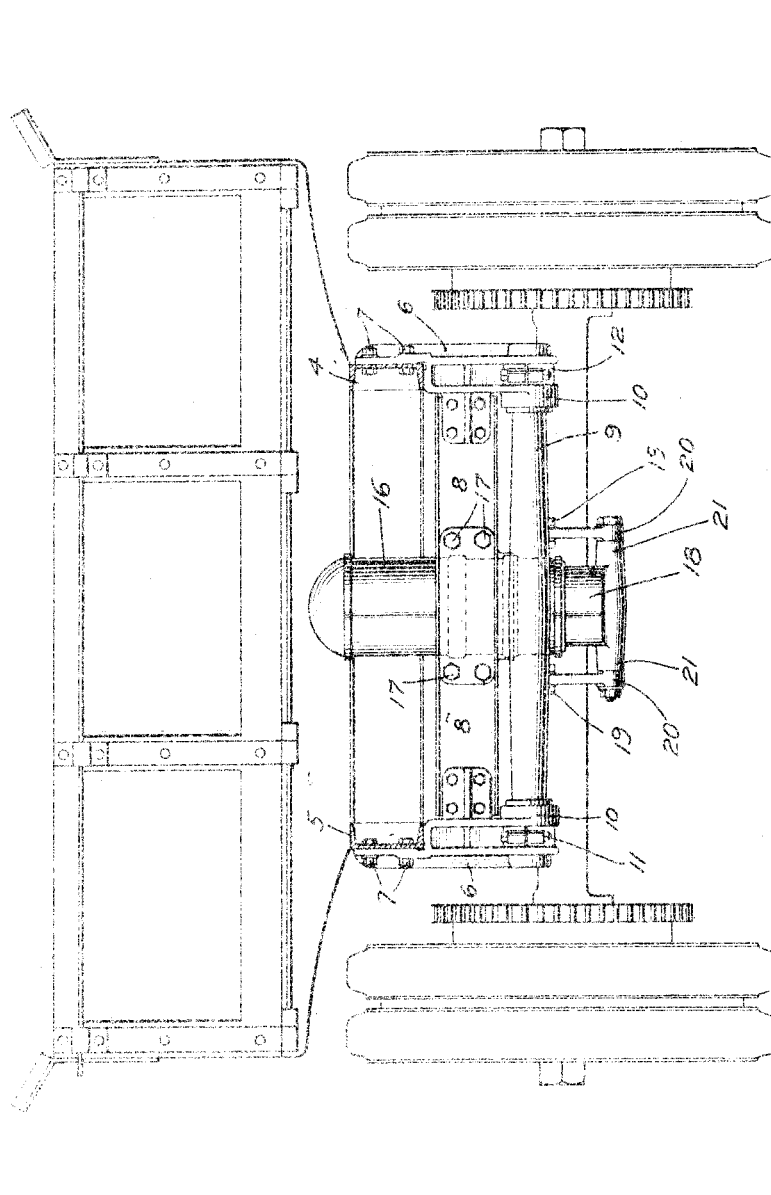

RICHARD LIEBAU, OF SWISSVALE, PENNSYLVANIA, ASSIGNOR TO WESTINGHOUSE AIR SPRING COMPANY, A CORPORATION OF PENNSYLVANIA.

VEHICLE AIR-SPRING.

1,179,198.   Specification of Letters Patent.   Patented Apr. 11, 1916.

Application filed June 3, 1913. Serial No. 771,431.

*To all whom it may concern:*

Be it known that I, RICHARD LIEBAU, a citizen of the United States, and a resident of Swissvale, in the county of Allegheny and State of Pennsylvania, have made a new and useful Invention in Vehicle Air-Springs, of which the following is a specification.

This invention relates to vehicle suspension and more particularly to spring suspension for vehicles such as automobiles, motor trucks, motor buses, delivery wagons, etc.

A number of applications for patent have been filed by me for elastic cushion devices and a number have been filed by George Westinghouse of Pittsburgh, Pennsylvania, and this invention more particularly relates to means for utilizing such cushion devices (hereinafter referred to as air springs) on the rear of motor vehicles, such as trucks and buses. In using such air springs on motor vehicles such as automobiles it has been customary to utilize four air springs, one on each corner of the chassis, connected up with one end of each of the four steel springs so as to operate in series therewith. It has been found, however, that owing to the tendency of top heavy vehicles, such as trucks, to lean or tip sidewise under certain circumstances, especially when rounding corners, it is desirable to utilize but one air spring in the rear of such vehicles and to couple the same up to the rear ends of the two rear steel springs in order to cut down to a certain extent the independent movement of said springs. With this end in view I have devised the means described in the specification forming a part of this application and illustrated in the drawings accompanying the same and throughout which like elements are denoted by like characters.

In the drawings: Figure 1 is a view in perspective looking toward the rear of a portion of a motor truck frame and the two rear steel springs with my invention shown in place; Fig. 2 is a side elevation of a portion of the motor truck; and Fig. 3 is a view in end elevation of the same.

The frames or load platforms of the motor trucks are generally provided with two channel sections 4 and 5 forming the longitudinal side members of the chassis. To each of these side members a depending bearing frame 6 is bolted as at 7. These bearing frames are also preferably bolted to a cross member 8 which may be a part of the chassis. A rock bar 9, journaled in suitable bearings 10 formed in the bearing members 6, is provided with lever arms 11 and 12 to the outer ends of which the rear ends of the leaf springs 13 and 14 of the chassis are connected by means of links 15.

An air spring 16, such as described in any of my said applications or the applications of said Westinghouse, is rigidly bolted to cross member 8 by means of bolts 17 and is provided with a relatively movable telescopic member 18. Rock bar 9 is provided with lever arms 19, one of which lies on each side of the air spring, and the outer ends of which are connected by means of links 20 to the bottom of trunnions 21 secured to the bottom of movable member 18.

From this construction it will be seen that while the two steel springs 13 and 14 operate in parallel to support the load platform, the air spring works in series with the two steel springs and adds its additional spring movement thereto.

If both of the rear wheels of the vehicle pass over substantially equal obstructions or depressions, the full movement of the steel springs and air spring can be utilized, but by coupling up the two steel springs to the air spring through the link and lever connections great independent movement of the opposite sides of the vehicle is prevented.

In accordance with the provisions of the patent statutes, I have described the principle of operation of my invention together with the device which I now consider to represent the best embodiment thereof, but I desire to have it understood that the device shown is only illustrative and that the invention can be carried out in other ways.

Having thus described my invention, what I claim is:

1. In combination with the load platform or frame of a vehicle, and the leaf springs arranged on opposite sides of said vehicle, a pneumatic spring comprising two relatively movable members, one of which is rigidly secured to the frame of the vehicle, a rock bar extending transversely across the frame of the vehicle and journaled on the frame, a lever mounted on the bar and pivotally connected to the other member of said pneumatic spring, lever arms located at each end of said bar and links for connecting said arms to said leaf springs.

2. In combination with the load platform of a vehicle and a leaf spring located at one side of the platform and between the platform and the running gear, a pneumatic spring comprising two relatively movable members, one of which is rigidly secured to the platform, a rock bar extending transversely of the platform and journaled thereon, a lever mounted on the bar, a pivotal connection between the other member of the pneumatic spring and said lever, and a lever arm and link for connecting said leaf spring to said rock bar.

3. In a vehicle in combination with its frame and leaf springs arranged on opposite sides thereof, a rock bar or shaft extending laterally of said vehicle, members depending from said frame in which said shaft is journaled, a telescopic air spring, one member of which is rigidly secured to the frame at an intermediate position with relation to the leaf springs, and links and levers for connecting the other member of said air spring and said leaf springs to said shaft so that said air spring will operate in series with said two leaf springs.

4. In combination with the frame and the leaf springs of a vehicle, a rock bar journaled on the frame, separate levers mounted on the bar and coupled to each leaf spring, an air spring having one member rigidly mounted on the frame of the vehicle, a second set of levers rigidly mounted on the rock bar and projecting in substantially the same direction as the first mentioned levers, and links for coupling the last mentioned levers to the air spring.

5. In combination with the frame of a vehicle and the leaf springs arranged on opposite sides thereof, a rock bar journaled on and extending transversely of the frame, forwardly extending levers rigidly mounted on the rock bar and coupled to the leaf springs, an air spring comprising two telescopic and relatively movable members, one of which is rigidly mounted on the frame, and a forwardly projecting lever rigidly mounted on the bar and coupled to the other member of the air spring.

In testimony whereof, I have hereunto subscribed my name this 31st day of May, 1913.

RICHARD LIEBAU.

Witnesses:
C. W. McGhee,
Anna Cloherty.